Figure 2:
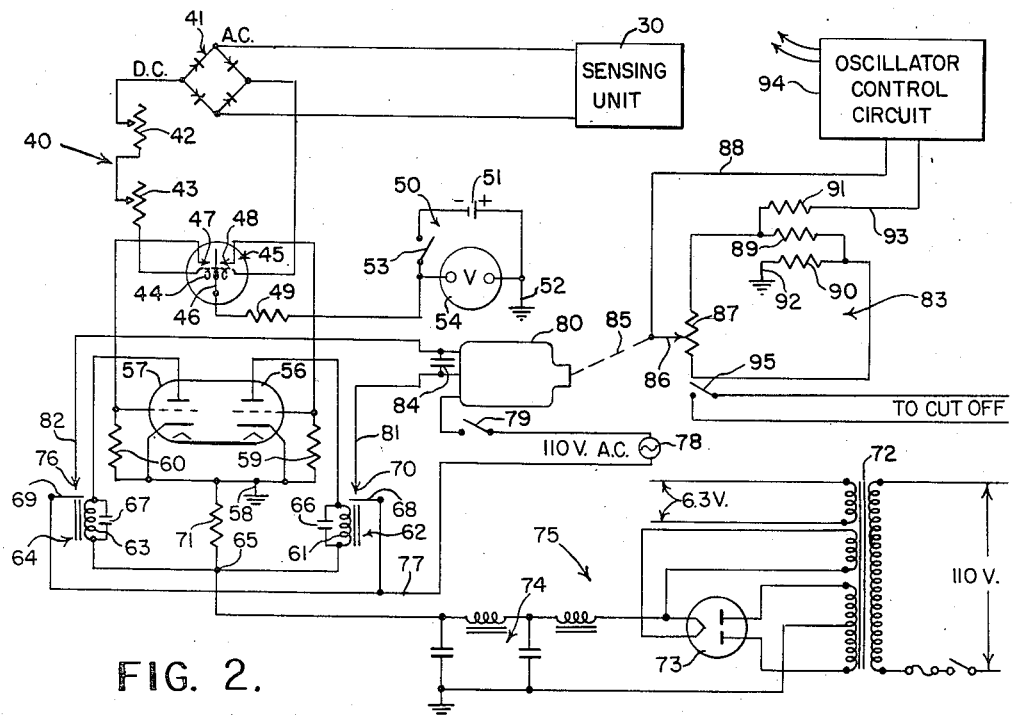

April 1, 1958 M. R. GROSS ET AL 2,828,622
AUTOMATIC AMPLITUDE CONTROLLER FOR VIBRATION FATIGUE MACHINE
Filed Sept. 15, 1954

INVENTORS
MARTIN R. GROSS
BY WILLIAM G. SCHREITZ

George Sipkin
B. L. Tanguell
ATTORNEYS

2,828,622

AUTOMATIC AMPLITUDE CONTROLLER FOR VIBRATION FATIGUE MACHINE

Martin Robert Gross, Eastport, and William Gordon Schreitz, Severna Park, Md.

Application September 15, 1954, Serial No. 456,343

7 Claims. (Cl. 73—67.3)

(Granted under Title 35, U. S. Code (1952), sec. 266)

The invention described herein may be manufactured and used by or for the Government of the United States of America for governmental purposes without the payment of any royalties thereon or therefor.

The present invention relates to improvements in measuring and testing apparatus. More particularly, the invention concerns an automatic means for controlling the amplitude of vibration of a material or system placed under fatigue or other characteristic tests in a measuring or testing apparatus employing vibratory methods.

In determining the physical characteristics of a material or system, especially the fatigue characteristics of a test specimen, it is customary to mount the test specimen in a measuring and testing apparatus and then vibrate the specimen artifically to produce mechanical stresses therein. The stress data obtained in this process is used to determine the suitability of the specimen for various functions as well as to determine the ability of the specimen to sustain forces applied thereto when the specimen is located in its intended field or arrangement.

In order to obtain satisfactory data, it has been found highly desirable to provide an amplitude control circuit in the measuring apparatus so that the specimen may be vibrated at a constant amplitude during the testing process. Some prior builders of fatigue testing apparatus have suggested that amplitude control circuits be built integrally with the test machine but these attempts have proven to be entirely unsatisfactory for several reasons. First, the pick-up coil of the control circuit was built integrally with the drive coil of the fatigue drive motor. As a result of this arrangement, it was found that the output of the pick-up coil contained current components of factors which were other than the amplitude of vibration. These components seriously affected the accuracy and control of the unit. Another disadvantage of the prior apparatus was that it could not be switched from manual to automatic control without a momentary interruption of the drive motor power supply. Consequently, when a high damping specimen was being tested in the apparatus and the unit was switched from manual to automatic control, this momentary interruption in the power supply created undue stresses in the specimen of an order that the specimen was usually damaged.

Because of the above-stated disadvantages the prior devices were usually, of necessity, manually controlled and/or required the constant attention of an operator. This, manifestly, limited a continuous test period of a specimen to the working period of an individual operator or plant, which usually was in the order of approximately eight hours per day.

In accordance with the provisions of the present invention, an improved automatic amplitude control is provided for a vibration generating apparatus to maintain the amplitude of a vibrating specimen constant. Due to the novel arrangement of the amplitude control, the generating apparatus is capable of operation without the continued presence of an operator, and, once the specimen has been stabilized, the vibration amplitude of the specimen is automatically controlled for relatively long periods of time. Moreover, this arrangement permits the switching from a manual to an automatic operation of the testing apparatus without the necessity of momentarily disconnecting the power supply to the apparatus. As such, the test specimen is free from any uncontrolled forces.

Accordingly, one object of the present invention is to provide a means for automatically maintaining a constant amplitude on a vibrating specimen.

Another object of the present invention is the provision of a simple and dependable amplitude control means which is adapted to be readily incorporated in existing test apparatus of the vibrational type.

A further object of the invention is to provide an amplitude control means for a vibrational test apparatus which may be switched from manual to automatic operation without interrupting the power supply to the apparatus, and which is capable of independent operation for relatively long periods of time.

Still another object of the invention is the provision of means for automatically de-energizing the vibration generating means whenever the amplitude of a vibrating test specimen attains a predetermined value.

Figure 1:
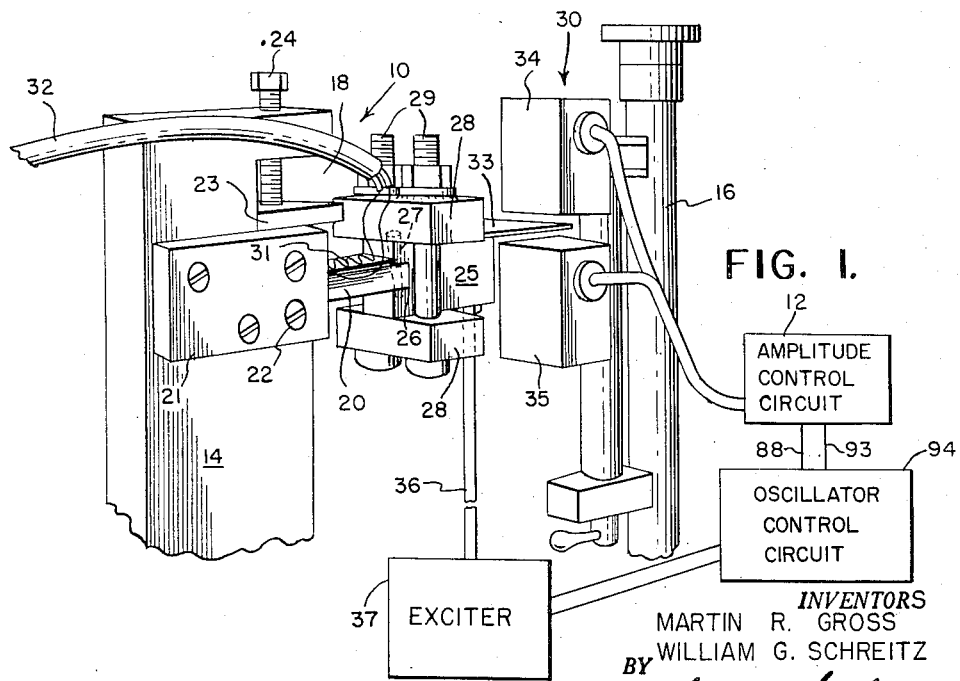

Other objects and many of the attendant advantages of this invention will be readily appreciated as the same become better understood by reference to the following detailed description when considered in connection with the accompanying sheet of drawing wherein:

Figure 1 is a fragmentary perspective view of a conventonal measuring and testing apparatus having the instant invention incorporated therein; and Figure 2 is a schematic showing of a preferred embodiment of the instant invention.

Referring now to the drawing wherein like reference characters designate like or corresponding parts throughout the several views, there is shown in Figure 1 a fragmentary perspective view of a conventional vibration fatigue apparatus 10 of the type towards which the instant invention is basically directed. This apparatus, as will hereinafter become apparent, basically comprises an exciter unit 37 which operates to mechanically vibrate a test specimen 20, suitably mounted on the apparatus. The exciter 37, in turn, is connected to and is energized by an oscillator control circuit 94 which, in accordance with the instant invention, is amplitude controlled by the amplitude control circuit 12, comprising a preferred embodiment of the instant invention.

It will further become apparent that in line with the teachings of the present invention, the amplitude control circuit 12 may be adapted for use with any measuring and testing apparatus wherein amplitude control of a vibrating object is desired, and, as such, should not be limited to any particular apparatus. However, one apparatus wherein the instant invention is particularly well adapted to be operated in conjunction therewith is shown in United States Letters Patent No. 2,300,926 issued on November 3, 1942 to J. A. Hutcheson.

Referring more specifically to Figure 1, vibration fatigue apparatus 10 generally comprises a base member (not shown) and a pair of vertically extended, supporting standards 14 and 16. Preferably, standard 14 is formed rectangular in shape and has a recess 18 on its upper inner end for receiving test specimen 20 which, in this embodiment, is disclosed as comprising a simulated gear tooth formed in a shape of a rectangular bar. It will be obvious that as different types of specimens are tested, the particular structural arrangement of standard 14 and the other specimen supporting members, as hereinafter described, may be changed to accommodate the particular structural features or test arrangements of the specimen under test. Specimen 20, in the disclosed embodiment, is supported and secured in position on standard 14 by a pair of braces 21 (only one of which is shown) horizontally disposed on opposite sides of standard 14. A plurality of bolts 22 are used to retain the braces 21, specimen 20 and standard 14 in rigidly secured alignment. Desirably, the bar specimen is reinforced on its upper outer end against possible flexing whenever the specimen is vibrated in the testing process. For this purpose, a reinforcement brace 23 is positioned within the recess 18 and against the upper outer surface of specimen 20. Brace 23 is securely locked in place by a vertically positioned bolt 24 which is adjustably mounted on the upper end of standard 14.

Secured on the opposite end of specimen 20 is a drive coupler 25. The drive coupler 25, which serves as a mechanical link between specimen 20 and exciter 37, is preferably provided with an aligning slotted portion 26 on its left end (as viewed in Fig. 1) of such a size that it receives and straddles the inner end of bar specimen 20 by a close fit. The two members are then rigidly but releasably secured together by a suitable pin or wedge 27 fitted within these members to provide a secure mechanical joint therebetween. To insure against any possible relative movement between these members 20 and 25 during the testing process, a pair of spaced, parallel crossheads 28 are positioned on opposite sides of coupler 25 in a joint-tightening arrangement; the cross-heads being forced together by a pair of spaced securing bolts 29 to retain the slotted portion of coupler 25 in tight engaging relation with the specimen. It will be apparent that the arrangement is fixed so that all flexing of a specimen occurs in a desired area and which, in the disclosed simulated gear tooth specimen, is in the relatively narrow, center cross-sectional area of the bar.

Vibrational movement is imparted to specimen 20 by a vertically extended rod 36 having its upper end suitably connected to coupler 25 and its lower end connected to the armature (not shown) of the vibration exciter 37. The exciter may comprise any power driven reciprocating unit of conventional construction, such as, for example, a conventional electro-magnetic vibration generator. The exciter is preferably carried on the base of apparatus 10 and serves, when suitably energized, to reciprocate rod 36 vertically. This reciprocating motion acts through coupler 25 to vibrate specimen 20 about its relatively narrow center portion. Conventionally, a strain gage 31 or other suitable indicating means is mounted upon specimen 20 and is provided with connecting wires 32 for remotely measuring and indicating the stresses in the member.

Secured on the upper right surface of coupler 25, as by an extension of rod 36, is a flat, horizontally positioned plate 33. Desirably, the plate is formed of a ferrous magnetic material such as mild steel and is extended outwardly from coupler 25 in spaced relation with a pair of sensing or pick-up elements 34 and 35 adjustably mounted on standard 16. These pick-up elements, in combination with the plate 33, comprise the amplitude sensing unit 30 of the instant invention. While any well-known or conventional type of pick-up element that provides a variable current output with a relative displacement of plate 33 from an intermediate mean position between elements 34 and 35 may be employed, each of the elements 34 and 35 preferably comprise sensing elements of the magnetic type. Such elements normally include a magnetic bar core having an electrical winding thereon; the winding of each element being serially connected to the other in mutually aiding relationship. The arrangement is such that upon movement of ferrous magnetic plate 33 from its mean position intermediate elements 34 and 35, an alternating current (or voltage) will be induced in the windings with the value of this current corresponding to the amount of deviation from the mean position and having a polarity which is directly related to the direction of plate movement from its central mean position.

In accordance with the present invention, an amplitude control circuit is provided which responds to the output current from sensing unit 30 to control the vibrational amplitude of exciter 37. This control, as best shown in Figure 2, includes a full wave rectifier 41 of the selenium bridge type, which is connected across the output of sensing unit 30, and a series adjustment circuit 40. Series circuit 40, as will hereinafter become apparent, serves as a center adjustment means for the amplitude control circuit, and includes a pair of variable resistances 42 and 43, and an actuating winding 44 of a relay 45; all of which are serially connected together and across the output of rectifier 41. Desirably, relay 45 is of the suppressed zero type wherein a signal having a value greater than a predetermined current value will energize winding 44 in such a manner that it attracts armature 46 into engagement with one contact, and a signal of lesser value than the predetermined value will cause armature 46 to engage the other contact. Relay 45 is provided with a pair of spaced stationary contacts 44 and 45 and a pivoted contactor or armature 46 positioned intermediate contacts 47 and 48.

Connected to armature 46, as through a current limiting resistor 49, is a biasing circuit 50. This circuit comprises a C-battery 51 having its positive terminal connected to ground potential as at 52 and its negative terminal connected through a bias supply switch 53 to the current limiting resistor 49. Desirably, a voltmeter 54 is placed across battery 51 to provide an accurate indication of the potential being applied from the biasing circuit 50 at any instant.

The potential developed in biasing circuit 50 is connected through contacts 47 and 48 and their associated leads to the control grids of a pair of normally conducting electronic tubes 56 and 57. Each of these tubes, which are contained in a single envelope for purposes of convenience only, is preferably of the triode type having a cathode element, a control grid element and a plate element. The cathode elements of these tubes are connected together and to ground potential at 58 while the control grid elements of tubes 56 and 57 are individually connected to contacts 48 and 47 of relay 45, respectively, and through a grid leak resistor 59 and 60, respectively, to ground potential 58. The plate elements of tubes 56 and 57 are each connected through a winding 61 and 63 of plate relays 62 and 64, respectively, to a B+ terminal indicated at 65. If desired, a capacitor 66 and 67 is connected across the winding of each relay 62 and 64 to prevent contact chatter that is normally caused by the back EMF induced in the inductor whenever a current change occurs in the winding.

While any suitable source may be employed to provide the B+ potential for tubes 56 and 57, it was found that the conventional full-wave rectifier indicated at 75 operated quite satisfactorily. This rectifier includes a power transformer 72 having its primary winding connected to an alternating current, power input source, and one of its secondary windings connected to the plate elements of a duo-diode vacuum tube 73. The pulsating current output from tube 73 is taken from its cathode element, filtered in an inductor input filter circuit 74 and then fed to the B+ terminal 65. Desirably, a load resistor 71 is placed across the B+ output supply and to ground to aid in stabilizing the voltage output of this circuit.

Each of the plate relays 62 and 64 is provided with a pivoted armature 68 and 69, respectively, and a stationary contact 70 and 76, respectively. The armatures 68 and 69 of these relays are connected together and to one terminal of an alternating current power source 78 through a line 77. The relay contacts 70 and 76, on the other hand, are connected through separate lines 81 and 82, respectively, to terminals on an alternating current, reversible motor 80. Preferably, a capacitor 84 is connected between the lines 81 and 82. The other terminal of the A. C. power source 78 is connected through a motor on-off switch 79 and to a third, ground terminal on motor 80. It will be apparent that with this arrangement, the associated armature and contact of relays 62 and 64 are connected in parallel and that, depending upon the operation of relay 62 or 63, reversible motor 80 will be energized from power source 78 through line 81 or 82 and through the common line of the power source 78. Energization of motor 80 through line 81 or 82 serves to provide a clockwise or counterclockwise direction of motor rotation.

Mechanically connected to the drive shaft of motor 80, as by the shaft connection indicated at 85, is a variable tap 86 of a potentiometer 87. The potentiometer, which may be of the circular type to provide a convenient method of varying its resistance value by a circular motor motion, is electrically connected in a resistor network 83 of the oscillator control circuit 94. Included in this network is a resistor 89, which is connected in parallel with potentiometer 87, a series connected resistor 90 having one end connected to the terminals of resistors 87 and 89 and its other end connected to ground potential as at 92, and a series connected resistor 91 having one end connected to the other terminal of resistors 87 and 89 and its other terminal connected through a lead 93 to the oscillator control circuit 94. Also, a lead 88 is connected from tap 86 to circuit 94 such that the output from network 83 is taken across leads 88 and 93.

The oscillator control circuit 94 may comprise any circuit arrangement in which a controllable signal, as to frequency and/or power output, may be obtained and wherein the signal is capable of driving vibration exciter 37. Preferably, resistor network 83 is inserted in the power output control circuit of circuit 94, and is connected in a manner similar to a conventional volume control so that upon variation of the resistance in this circuit, through potentiometer 87, the power output of circuit 94 may be controlled. It will be obvious, however, that the resistor network need not be incorporated in any particular portion of an oscillator control circuit as long as circuit 83 controls the output of the oscillator circuit. In the event the instant invention is incorporated in an existing device, such as, for example, that disclosed in said Patent No. 2,300,926, it will be clear that one appropriate location for the resistor network would be to place the network in the output circuit of the Beat Frequency Oscillator.

*Operation*

The overall operation of the amplitude control circuit is as follows: assuming that a specimen is to be tested as to its fatigue characteristics; that the specimen is properly secured in position on apparatus 10; and that the various circuits with the exception of motor 80 are energized through their appropriate control switches. As the oscillator control circuit is energized, a power output is developed in its output circuit and fed to exciter 37 to begin the vibration or reciprocating function of the exciter. Through the medium of rod 36 and coupler 25, this reciprocating movement is imparted to the specimen 20 which will then vibrate at the driven frequency of reciprocation; the latter being initially controlled by varying the output frequency of oscillator control circuit 94.

Because of its rigid connection to coupler 25, plate 33 will follow the motion of specimen 20 as it is vibrated. As the plate moves about a mean position between sensing elements 34 and 35, the sensing unit, comprising these elements, will develop an alternating current signal in its output having an amplitude which is proportional to the deviation of plate 33 about the mean position. The output from the sensing unit is then applied to rectifier 41 wherein the alternating current is converted to a varying direct current signal which is proportional to the absolute or full cycle vibration amplitude of the specimen. This D. C. signal is then fed to the series circuit 40 including relay winding 44. According to the developed current strength, whether it is equal to, greater or lesser than the predetermined current factor of relay 45, the winding will be energized in a manner that the armature remains in its mean position, engages contact 47, or engages contact 48, respectively.

It will become apparent that as long as switch 79 remains open, motor 80 is deenergized. Hence, this signal is ineffective to control oscillator control circuit 94. Consequently, the apparatus is manually controlled. Desirably, the vibration of the test specimen is manually controlled until the specimen attains its natural frequency of vibration, and which frequency will vary with the particular specimen under test. However, once the specimen attains its natural frequency, as by varying the output frequency of circuit 94, switch 79 is closed to connect the power source 78 to motor 80. Meanwhile, rheostats 42 and 43, in the series adjustment circuit 40, are adjusted to limit the current flow through winding 44 to a value which maintains the relay armature 46 in its neutral position. Preferably, the rheostats, which serve as a sensitive control, are adjusted to provide a current which will substantially zero the relay 45 whenever the specimen is operating at its desired amplitude and frequency.

After these adjustments, should the frequency or amplitude of vibration change, a signal will be developed in the series circuit which is sufficient to energize relay 45. This action serves to apply a bias voltage from biasing circuit 50 to the control grid of tube 56 or 57. As the bias potential is applied to one of these tubes, as for example tube 56, the tube, which is normally conducting, is cut off.

Consequently, relay 62, which has its winding 61 connected in the plate circuit of tube 56, is de-energized. This action releases armature 68 such that armature 68 engages contact 70 to close the power circuit from power source 78 to motor 80. The power circuit is completed through lines 77, armature 68, contact 70, line 81, motor 80 and back to power source 78 through switch 79. This power circuit will then energize motor 80 in a manner to rotate motor in a first direction, say in a clockwise direction. It will be apparent that in the event armature 46 of relay 45 engages contact 47, the circuit of tube 57 will operate similarly to the circuit of tube 56 with the exception that motor 80 will be energized through lead 82 and the motor will rotate in the opposite direction, as for example, in a counterclockwise direction.

As motor 80 begins to revolve, tap 86 is moved across the resistance portion of potentiometer 87. This serves to change the effective resistance of resistor network 83 and hence, will change the power output of oscillator control circuit 94. Since this change in output will be correcting in nature, the power output of the circuit will be varied in a manner so as to increase or lessen the power fed to exciter 37. Hence, any deviations from the set amplitude and frequency of specimen vibration will be automatically corrected.

If desired, a limit switch 95 may be incorporated in the unit and positioned such that whenever tap 86 of potentiometer 87 is moved beyond a certain point, indicating the vibration amplitude of the specimen has attained a predetermined value above said set value, the limit switch is engaged and actuated to a closed position. This limit switch, in turn, is placed in the power circuit of the oscillator control circuit so as to de-energize the entire vibration generator.

From the foregoing it will be apparent that there is provided an improved amplitude control circuit which is operative to control the vibration amplitude of a vibration generator within exacting limits. Moreover, it will be apparent that once placed in operation, the apparatus will operate independently for long periods of time at a set amplitude and will act to automatically de-energize the apparatus whenever a predetermined vibration amplitude above said set amplitude is attained. However, it will be apparent that until this latter condition occurs, the operation will be automatically controlled through the rebalancing circuit. It is to be noted also that with this circuit, the automatic control can be energized without momentarily interrupting the power supply of the vibration generator, and, further, that the amplitude control of the vibration generator is limited to amplitude factors only inasmuch as no other factors are introduced into the sensing unit.

Obviously many modifications and variations of the present invention are possible in the light of the above teachings. It is therefore to be understood that within the scope of the appended claims the invention may be practiced otherwise than as specifically described.

What is claimed is:

1. In a power driven vibration test apparatus having a test specimen mounted thereon and a vibration generator for vibrating said specimen, an amplitude control means for said specimen comprising, sensing means positioned adjacent said specimen for producing a signal output having a value corresponding to the vibration amplitude of the specimen, a directionally operative control relay connected to said sensing means, movable means operatively connected to said relay for movement in a direction determined by the directional operation of said relay, and network means controlled by said movable means, said network means being operative to control the input power to said vibration generator for controlling the vibration amplitude of said specimen.

2. In an apparatus as defined in claim 1 but further characterized by means positioned adjacent said network means and operable by said movable means for interrupting the power input to said test apparatus upon the test specimen reaching a predetermined amplitude of vibration.

3. An amplitude control for a driven vibrating element comprising, a vibration exciter mechanism connected to the element for vibrating the same at a constant amplitude, said exciter mechanism including a controllable input power source, sensing means positioned adjacent said element for producing an electrical output having a value corresponding to the vibration amplitude of the element, means directionally responsive only to variations in the electrical output indicative of amplitudes above and below said constant amplitude for controlling the input power source of the exciter mechanism, said means responsive to variations in the electrical output comprising, a first relay connected to said sensing means and operable to a first and second position, a pair of electronic tubes connected to said first relay, each of said tubes having a first and a second state, a second and a third relay one of which is connected in the circuit of each of said electronic tubes, said second and third relays being operable upon a change of state in its respective tube, motor means connected to said second and third relays, said motor means being operative to rotate in a predetermined direction whenever one of said second and third relays is actuated by a change in state of its respective tube, and means responsive to the rotation of said motor means for varying said input power source.

4. In an apparatus as defined in claim 3 but further characterized by an impedance network connected to the input power source of the exciter mechanism, said impedance network including a variable impedance element, and mechanical means connecting said motor means to said variable impedance means.

5. In an apparatus as defined in claim 4 but further characterized by an electrical bias source connected to said first relay, said bias source being connectable by said relay to the first and second electronic tubes and operable, when connected to one of said tubes, to cause said tube to change from its first to its second state.

6. In a vibration excited apparatus for producing a vibration of a test specimen carried by said apparatus, a control system for automatically controlling the vibration amplitude of said specimen comprising, a pair of sensing elements positioned adjacent said specimen for producing a current output having a value which is proportional to the vibration amplitude, means connected to the sensing elements for rectifying said current output, an adjustable series circuit in the output of said last named means, said series circuit including a suppressed zero relay having a pair of contact means operable to closed position upon a variation in the current output, a potential bias source, a pair of normally conductive electronic tubes one of which is electrically connected to one of said contact means of the relay, said bias source being connected to said relay and operable to be connected to each of said electronic tubes upon the actuation of said relay, a pair of electronically controlled relays one of which is in the circuit of each of the electronic tubes, a reversable control motor connected to said electronically controlled relays, a variable resistive network, a mechanical connection means between said motor and said resistive network for varying the effective resistance of the network, and a power source connected to and controlled by the effective resistance of said network, said power source being connected to said apparatus to control the amplitude of vibration.

7. In an apparatus as defined in claim 6 but further including limit means positioned adjacent said resistive network and in engaging relation with said mechanical connection, said limit means being connected in the power source of the vibration excited apparatus, whereby operation of the limit means is effective to de-energize the apparatus.

References Cited in the file of this patent

UNITED STATES PATENTS

| | | |
|---|---|---|
| 2,326,033 | Hutcheson | Aug. 3, 1943 |
| 2,373,351 | Sims | Apr. 10, 1945 |
| 2,602,326 | Russenberger | July 8, 1952 |
| 2,779,190 | Benda | Jan. 29, 1957 |